United States Patent [19]
Quante

[11] 3,946,144
[45] Mar. 23, 1976

[54] SEALED CABLE JUNCTION
[75] Inventor: Hermann Quante, Wuppertal, Germany
[73] Assignee: Wilhelm Quante Spezialmaschinenfabrik fur Apparate der Fernmeldetechnik, Wuppertal, Germany
[22] Filed: June 26, 1974
[21] Appl. No.: 483,440

[30] Foreign Application Priority Data
June 28, 1973 Germany............................ 2332847

[52] U.S. Cl................. 174/92; 174/21 R; 174/88 R
[51] Int. Cl.² ........................................ H02G 15/08
[58] Field of Search............................ 174/91–93, 174/88 R, 76, 77 R, 21 R

[56] References Cited
UNITED STATES PATENTS
3,240,868  3/1966  Ets-Hokin et al................. 174/21 R
3,636,240  1/1970  Quante et al........................ 174/92

FOREIGN PATENTS OR APPLICATIONS
1,378,723  10/1964  France................................. 174/76

Primary Examiner—Darrell L. Clay
Attorney, Agent, or Firm—Michael J. Striker

[57] ABSTRACT

A cable junction has a longitudinally subdivided housing having two connected shell sections which together surround an interior splicing chamber. A pair of shell inserts of fluid-impermeable material is accommodated in the housing about the splicing chamber and they have respective outwardly projecting juxtaposed marginal flanges which are jointly formed with a longitudinal channel bounded at its opposite lateral sides by respective juxtaposed surface portions of the flanges. A strand of sealing material is accommodated in compressed state in this channel.

14 Claims, 2 Drawing Figures

U.S. Patent   March 23, 1976   3,946,144
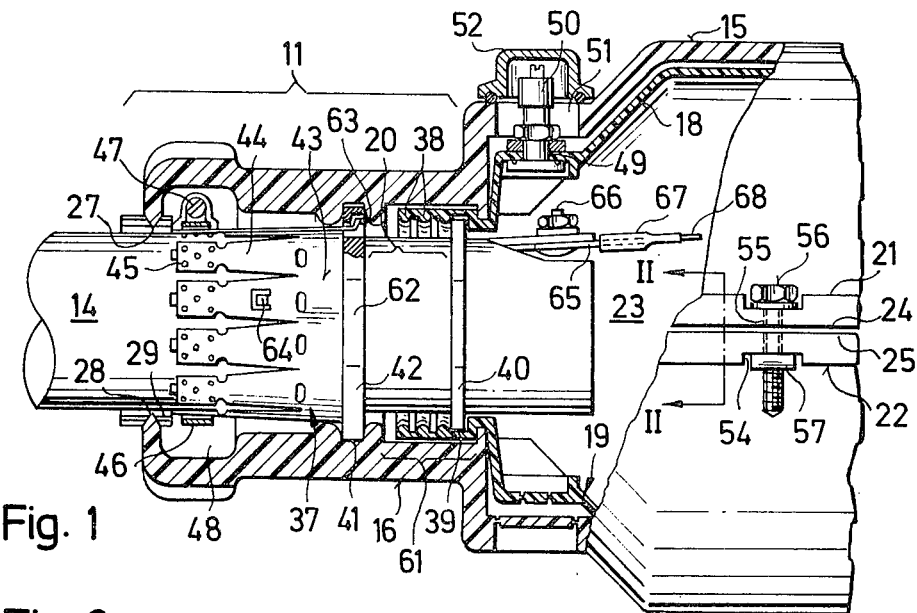
Fig. 1
Fig. 2
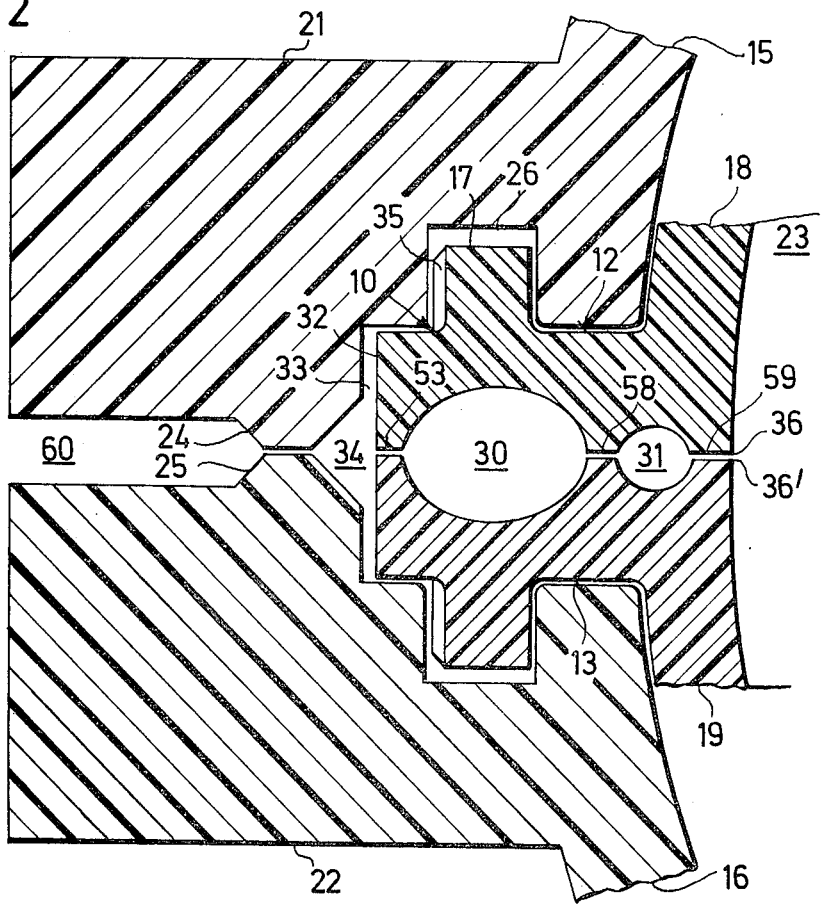

SEALED CABLE JUNCTION

BACKGROUND OF THE INVENTION

The present invention relates generally to a cable junction, and more particularly to a sealed cable junction. Still more specifically, the invention relates to a sealed cable junction which is usable to particular advantage for splicing-together of communications cables, but is not limited to use with this type of cables.

Cable junctions are devices into which the end portions of two or more cables enter through openings provided in the device, and which devices have an interior chamber wherein these end portions are spliced together to provide an electrical connection between the cables. It is known to provide a type of cable junction having a housing wherein a pair of shell sections is accommodated as a separate installation unit. These shell sections, which together define and surround the splicing chamber within the housing, are formed with longitudinally extending flanges projecting from the edges of the shells and having a substantially U-shaped configuration. These flanges are sealed with respect to one another and to the housing by a plastically deformable rope of sealing material when the cable junction is assembled. The flanges extend to the ends of the cable junction where the inlet and outlet openings for the cables are located, and they merge with seals provided in these regions and serving to seal the outer surface of the cable with respect to the housing. It is also known from this prior-art construction to make the shell inserts of low-pressure polyethylene or of metal.

Basically, this approach of the prior art to the construction of the cable junction is more advantageous than the prior art which preceded it.

However, even this type of construction still has certain disadvantages which are not yet overcome. In particular, the cables extending through the inlet and outlet openings of these junctures are not tightly enough engaged and are therefore not properly sealed. From this it follows that the splicing chamber itself is also not properly sealed with respect to the ambient atmosphere. The reason for this probably is the result of the mechanical stresses acting in the region of the inlet and outlet openings, and also the permanent stresses which act in the region of the aforementioned flanges.

SUMMARY OF THE INVENTION

It is, accordingly, a general object of the invention to overcome the disadvantages of the prior art.

More particularly, it is an object of the invention to provide an improved cable junction which is reliably sealed and which avoids the disadvantages of the prior art.

Another object of the invention is to provide such an improved cable junction which is simple and comparatively inexpensive to operate and to use.

In keeping with these objects, and with others which will become apparent hereafter, one feature of the invention resides in a sealed cable junction which, briefly stated, comprises a longitudinally subdivided housing having two connected shell sections which together surround an interior splicing chamber. A pair of shell inserts of fluid-impermeable material is accommodated in the housing and has respective outwardly projecting juxtaposed marginal flanges which are jointly formed with a longitudinal channel bounded at its opposite lateral sides by respective juxtaposed surface portions of the flanges. A strand or sealing material is accomodated in compressed state in this channel.

For the strand of sealing material to be accommodated in the channel in compressed state, it is necessary that the cross-section of the strand be in excess of the cross-section of the channel. It does not only provide a reliable seal, but also causes some of the material of the strand to be squeezed out of the channel and into the space between the juxtaposed surface portions which are located at opposite lateral sides of the channel. This provides a particularly good sealing effectiveness, and an especially effective barrier against the entry of moisture that might otherwise creep along the respective surfaces, since in effect it constitutes a labyrinthine path for such moisture which would have to first creep between the juxtaposed surfaces and the sealing material at the outwardly located side of the channel, then around the channel between the walls of the same at the sealing material therein, and then again between the sealing material and the juxtaposed surfaces of the flanges at the inward side of the channel before it could enter into the splicing chamber.

The sealing effectiveness of the juncture according to the present invention is particularly reliable when the juxtaposed surface portions which laterally bound the channel are formed with one or more additional grooves or depressions which extend along the channel, and into which the sealing material that has been squeezed out of the channel can also enter. This increases the length of the labyrinthine path. In many instances it will already be sufficient if such an additional groove is provided only at the inwardly located side of the main channel, that is that side which faces towards the splicing chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS:

FIG. 1 is a fragmentary axial section through a portion of a novel junction according to the present invention, some parts not being shown in section; and FIG. 2 is an enlarged-scale detail view, illustrated as a section taken on line II—II of FIG. 1.

DESCRIPTION OF THE PREFERRED EMBODIMENTS:

A consideration of a portion of the novel juncture according to the present invention will suffice for an understanding of the invention. Therefore, FIG. 1 shows, partially in section, only a portion of such a juncture, in the region of one end wherein a cable inlet and outlet opening 11 is provided. The cable itself is identified with reference numeral 14.

The junction has a housing which is longitudinally subdivided and composed of two identical shell sections 15, 16. Located in the space surrounded by these shell sections is a pair of similarly longitudinally subdivided shell inserts 18, 19 which are also identical. The regions of contact 24, 25 of the shell sections 15, 16 are formed with outwardly extending flanges 21, 22 which are firmly drawn together by screw connections 56.

Longitudinally extending outwardly projecting flanges 12, 13 on the shell inserts 18, 19 are juxtaposed with one another and extend between these flanges 21, 22 of the shell sections 15, 16 so as to be squeezed together as the shell sections 15, 16 are drawn together by the screw connections 56.

Details of the flanges 12, 13, and their cooperation with the flanges 21, 22, are shown more clearly in the enlarged-scale view of FIG. 2. It will be seen that each of the flanges 12, 13 is of substantially T-shaped cross-section. Since the shell sections 15, 16 are identical with one another, and the same is true of the shell inserts 18, 19, it will suffice for an understanding of the invention to illustrated and describe only the portion shown in FIG. 2.

A cross-bar 17 of the T-shaped composite flanges 12, 13 has two longitudinally extending rib portions, that is the portions which extend outwardly beyond the center bar of the T-shape, and these are each received in a recess 26 of a longitudinally extending groove 10 formed in a respective one of the shell sections 15, 16; this groove 10 extends parallel to the circumference of the respective shell inserts 18, 19. This assures a reliable mechanical connection between the shell inserts and the shell sections. The outwardly extending portion 32 of the respective flanges 12, 13 is slightly shorter in outward direction than the corresponding recess in the associated shell sections 15, 16, so that a space 33 remains into which the sealing material can be squeezed, as will be subsequently discussed. This space 33 increases to the gap between the two areas of contact 24, 25 to form an arrowhead-shaped groove 34 when the shell sections 15, 16 are connected with one another. To assure a proper alignment of the shell sections 15, 16 with reference to the shell inserts 18, 19, the ribs 17 are formed on the outwardly directed sides with projections 35 which can be located at relatively large spacing from one another.

The flanges 12, 13 are formed with juxtaposed surfaces 36, 36' which extend longitudinally of the junction and which are formed with a similarly longitudinally extending main channel 30 composed of two juxtaposed grooves formed in the surfaces 36, 36', and at least one auxiliary passage or channel 31 which is spaced from and extends substantially parallel to the channel 30. At opposite lateral sides of the channels 30, 31 are located juxtaposed contact zones 53, 58, 59 in which the surfaces 36, 36' can contact one another when the juncture is assembled.

During the assembly a rope-like or cord-like strand of sealing material — for instance a suitable synthetic plastic — is placed into the channel 30. This strand of sealing material has a diameter which exceeds that of the channel 30 by a sufficient amount to assure that when the shell inserts 18, 19 are squeezed together, the sealing material in the insert will be squeezed out of the channel 30 through the zones 53, 58 into the channel 31 and the gap 34, so that the channel 31 and the gap 34 are also filled with the sealing material. Moreover, there must be sufficient sealing material to assure that some of it will also be pressed through the zone 59 and reach the edge of the splicing chamber 23. The same is true also at the gap 34 where, due to the arrowhead-shaped configuration, the material is squeezed into the outwardly directed gap between the flanges 21, 22. Some of the material will also be squeezed into the space 33, into the region adjacent the noses 35 and into the groove 10, and finally also into the recess 26.

It will be appreciated that this takes place when the shell sections 15, 16 have been placed about the shell inserts 18, 19 and are drawn together by the screw connections 56. It will also be appreciated that the sealing material thus provides a labyrithien seal which is fluid impermeable, and which will be automatically established as the juncture is assembled, without requiring any special measures other than to place the sealing material initially into the channel 30.

It is advantageous if the material of the shell sections 15, 16 is of glass fiber-reinforced polyester resin, this being a material that has been found to have sufficient mechanical strength for most applications. In order to provide an improved sealing effect, and in particular to prevent the permeation of fluid through the shell inserts 18, 19 it is advantageous if these shell inserts are made of a polyolefin resin, for instance polypropylene. While in many instances the seal obtained by the construction described with respect to FIG. 2 will be entirely sufficient, the sealing effect can be further improved, and the labyrinthine path which prevents fluid travel through the seal be increased, by providing one or more additional auxiliary channels 31 into which the sealing material would then also be squeezed. It will be appreciated that the seal will be effective not only to prevent the entry of fluids from the exterior, but also to prevent the escape of fluids from the interior, for instance if an air pressure valve 50 is provided as shown in FIG. 1, by means of which the interior of the chamber 23 can be pressurized with air (or another gas under pressure) to provide a further protection (due to the interior overpressure) to the entry of contaminants. The various zones 59, 58, 53, 24 and 25, wherein squeezing of the sealing material takes place, assure that the sealing material cannot creep back or receed and open some of all of the portions of the labyrinthine path outside the channel 30.

Returning to FIG. 1 it will be seen that the ends of the shell inserts 18, 19 terminate in a space 20 located between two sealing washers 40, 42. The space 20 serves to accommodate the terminal seals between the inserted cables (here the cable 14) and the shell sections 15, 16. The sealing material which would be accommodated in this space 20 is not illustrated for the sake of clarity, but should be understood to be present. This space 20 is located in the region of the cable inlet and outlet openings (here the opening 11). The inner sides of the inserts 18, 19 are formed with circumferentially extending radial ribs 38, which serve to compress the plastically deformable sealing material intermediate the sealing washers 40, 42 extending vertically thereto, but the circumferential inner surface of the annular zone 61 of the two surrounding shell sections 15, 16 is smooth, so that the sealing material can be pressed in at this region. This construction has, inter alia, the advantage that in case of differential shrinkage during the manufacture of the shell sections and shell inserts, no difficulties will be experienced in assembling the junction. The seals established by the presence of the sealing material in the channel 30 and the associated auxiliary channel or channels and juxtaposed surface portions, extend without interruption into the sealing material provided in the spaces 20, so that a circumferentially complete seal is established. Moreover, a mechanical stress relief device 37 is provided in conjunction with each of the openings (one shown for the opening 11), and the arrangement of the stress relief devices 37 is such that stresses transmitted by them or to them cannot disadvantageously influence the seal which has been so established, even though unavoidable movements of the cable 14 transmits stresses via the device 37.

For this purpose, the device 37 is located outside the space 20. The device 37 itself is composed of one of the sealing washers, namely the sealing washer 42 which together with the sealing washer 40 may be of a deformable synthetic plastic sealing material, both of the washers having a central opening corresponding to the outer diameter and cross-section of the respective cable, here the cable 14. The inner sealing washer 40 is accommodated in a radial groove 39 of the inserts 18, 19, whereas the outer sealing washer 42 is located in a radial groove 41 of the shell sections 15, 16. This means that any movements of the sealing washer 42 are no longer transmitted to the inserts 18, 19 and thus cannot influence the seal between them.

The washer 42 is connected with a crown-shaped holding ring 43, for instance due to a rigid connection or by making them of one piece with one another. In any case, the ring 43 is of one piece and is composed of a plurality of bendable tongues 44 which can be moved radially towards one another and are provided with punched-out blade portions 45 at their free ends, which can be pressed into the outer circumference of the jacket of the cable 14 by means of a clamping ring 46 which can be tensioned by the screw 47. It is clear that all mechanical stresses originating in the cable and being transmitted to the cable junction are intercepted by the device 37 before they can be transmitted to the seal that has been established between the inserts 18, 19, and are thus transmitted directly to the shell sections 15, 16. Torsional stresses upon the washer 42 are simply absorbed due to the fact that the washer 42 is non-circular in configuration, by being provided with the flattened sections 62, for which purpose the groove 41 is correspondingly configurated.

The ring 43 is made of a one-piece strip of sheet material which should be corrosion resistant or an appropriate synthetic plastic material, and the tongues 44 are stamped out of this material. Projections 63 on the ring 43 are passed through openings in the washer 42 and bent over at the reverse side of the latter, to connect the ring 43 with the washer if it is not already of one piece with the same. If they are of one piece, then of course the ring would be of the same synthetic plastic material as the washer 42.

In the region of the inlet and outlet openings for the cables, that is in FIG. 1 the illustrated opening 11, the shell sections 15, 16 surround a closed annular space 48 which accommodates the respective ring 43 and the clamp 46. A pointed edge 27, 28 formed on the respective shell sections 15, 16 is pressed into a layer 29 of sealing material, such as natural or synthetic rubber strip, or synthetic plastic sealing material, which is placed about the cable jacket and into which the edges 27, 28 are sealingly pressed, so that no contaminants can enter into the space 48 even though the juncture might be directly buried in the ground.

In some instances the sealing washer 40 might be omitted and a further sealing washer 42 having another ring 43 might be employed in its place, for instance in order to obtain an electrical contact between metallic cable jackets of the cables which are being spliced together. Such an electrical contact can be obtained in a simple manner if one of the rings 43 is provided with a contact portion 64. This can then be inserted into appropriate connectors which extend to the respective cable jackets. On the other hand, a contact portion 65 can be provided, in which case the jacket of the respective cable, here the cable 14, is provided with a longitudinal slot and bent out, and the contact portion 65 is fixed at this point by means of a screw connection 66. At the other end the contact portion 65 may be provided with a tongue on which a member 67 can be pushed, which is connected with a conductor 68 extending to a further cable in the interior of the splicing chamber 23, which further cable is not illustrated.

The valve 50 extends through a cutout 51 of the shell section 15 which can be sealingly closed by a cover 52, and serves to admit compressed air or other gas into the splicing chamber 23 so that the latter can be maintained at interior overpressure, to prevent the entry of contaminants even more reliably. The valve 50 also serves to connect a measuring instrument when the interior pressure in the splicing chamber 23 is to be measured from time to time to see whether any of the admitted pressurized air or gas has leaked out.

Steps 54 are formed in the flanges 21, 22 of the shell sections 15, 16, and are provided with openings 55 through which the screw connections 56 extend. These steps receive polygonal nuts 57 which, due to the configuration of the steps and of the nuts themselves, are prevented from turning. A retaining ring can be used to hold the screws 56 in place.

It will be understood that each of the elements described above, or two or more together, may also find a useful application in other types of constructions differing from the types described above.

While the invention has been illustrated and described as embodied in a sealed cable junction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A sealed cable junction sealing a splice connection between cables, comprising a longitudinally subdivided housing having two connected shell sections which together surround an interior splicing chamber wherein spliced-together cable end portions are located; a pair of shell inserts of fluid-impermeable material accommodated in said housing and having respective outwardly projecting juxtaposed marginal flanges which are jointly formed with a longitudinal channel bounded at its opposite lateral sides by respective juxtaposed surface portions of said flanges; a strand of sealing material accommodated in compressed state in said channel; and at least one auxiliary passage formed in said juxtaposed surface portions and adapted to accommodate sealing material that might be squeezed out of said channel.

2. A cable junction as defined in claim 1, wherein said passage is located intermediate said channel and said chamber.

3. A cable junction as defined in claim 1, said housing having openings through which said cables extend; and further comprising a mechanical stress-relief device at each of said openings cooperating with a respective one of said cables.

4. A cable junction as defined in claim 3; further comprising radial washers of synthetic plastic material at each of said openings; and wherein said devices each comprise an annular holding ring disposed outwardly of but adjacent said washers at a respective opening and provided with radially deflectable tongues engaging the surrounded cable.

5. A cable junction as defined in claim 4, wherein said holding ring has a ring portion which is connected with one of said washers.

6. A cable junction as defined in claim 5, wherein said holding ring is of one piece with one of said washers.

7. A cable junction as defined in claim 1, wherein the cables have electrically conductive jackets; and further comprising means in said splicing chamber conductively connecting said jackets of respective cables which are spliced together in said chamber.

8. A sealed cable junction sealing a splice connection between cables, comprising a longitudinally subdivided housing having two connected shell sections which together surround an interior splicing chamber wherein spliced-together cable end portions are located; a pair of shell inserts of fluid-impermeable material accommodated in said housing and having respective outwardly projecting juxtaposed marginal flanges which are jointly formed with a longitudinal channel bounded at its opposite lateral sides by respective juxtaposed surface portions of said flanges, said juxtaposed mated flanges having a composite cross-section resembling a T, the cross-bar of which is received in respective juxtaposed grooves formed in said shell sections and the upright bar of which is provided with said surface portions.

9. A cable junction as defined in claim 8, wherein said cross-bar has slight play in its direction of elongation in said grooves in which it is received.

10. A cable junction as defined in claim 8, wherein said grooves are bounded by bevelled edge portions on said shell sections at a side of said grooves facing inwardly towards said chamber.

11. A sealed cable junction sealing a splice connection between cables, comprising a longitudinally subdivided housing having openings through which the cables extend and two connected shell sections which together surround an interior splicing chamber wherein the spliced-together cable end portions are located, said shell sections having smooth surface portions; a pair of shell inserts of fluid-impermeable material accommodated in said housing and having respective outwardly projecting juxtaposed marginal flanges which are jointly formed with a longitudinal channel bounded at its opposite lateral sides by respective juxtaposed surface portions of said flanges, said shell inserts being formed with radially projecting ribs in the region of said respective openings, and facing said smooth surface portions of said shell sections in said regions; and a strand of sealing material accommodated in compressed state in said channel.

12. A sealed cable junction sealing a splice connection between cables, comprising a longitudinally subdivided housing having openings through which said cables extend and having two connected shell sections which together surround an interior splicing chamber wherein the spliced-together cable end portions are located; a pair of shell inserts of fluid-impermeable material accommodated in said housing and having respective outwardly projecting juxtaposed marginal flanges which are jointly formed with a longitudinal channel bounded at its opposite lateral sides by respective juxtaposed surface portions of said flanges, said surface portions defining a labyrinthine path with said surrounding shell sections; a strand of sealing material accommodated in compressed state in said channel and also at least partially filling said labyrinthine path formed between said shell sections and said inserts, so as to establish a circumferentially complete seal; radial washers of synthetic plastic material at each of said openings, at least one of said washers being of noncircular configuration, said shell sections being provided at each of said openings with a surrounding groove which accomodates said one washer in mating relationship; and further comprising a mechanical stress-relief device at each of said openings cooperating with a respective one of said cables, each of said devices comprising an annular holding ring disposed outwardly of but adjacent to said washers at a respective opening and provided with radially deflectable tongues engaging the surrounded cable.

13. A cable junction as defined in claim 12, wherein said shell sections form at each of said openings an annular space in which a respective one of said holding rings is received.

14. A cable junction as defined in claim 12, wherein said holding ring has a contact portion in conductive engagement with a respective one of said cables.

* * * * *

UNITED STATES PATENT AND TRADEMARK OFFICE
CERTIFICATE OF CORRECTION

PATENT NO. : 3,946,144
DATED : March 23, 1976
INVENTOR(S) : Hermann Quante

It is certified that error appears in the above-identified patent and that said Letters Patent are hereby corrected as shown below:

In the heading [73], the name of the assignee should read -- Wilhelm Quante,
 Spezialfabrik für Apparate der
 Fernmeldetechnik --.

Signed and Sealed this

Sixteenth Day of November 1976

[SEAL]

Attest:

RUTH C. MASON
Attesting Officer

C. MARSHALL DANN
Commissioner of Patents and Trademarks